(12) United States Patent
Fulconis et al.

(10) Patent No.: US 7,204,929 B2
(45) Date of Patent: Apr. 17, 2007

(54) METHOD FOR TREATING AN EFFLUENT, ESPECIALLY A RADIOACTIVE EFFLUENT, CONTAINING ORGANIC MATTER

(75) Inventors: Jean-Michel Fulconis, Roquemaure (FR); Jacques Delagrange, St. Paulet de Caison (FR); Jean Sarrazin, Montperrier (FR)

(73) Assignee: Commissariat a l'Energie Atomique, Paris (FR)

( * ) Notice: Subject to any disclaimer, the term of this patent is extended or adjusted under 35 U.S.C. 154(b) by 80 days.

(21) Appl. No.: 10/481,534

(22) PCT Filed: Jun. 20, 2002

(86) PCT No.: PCT/FR02/02135

§ 371 (c)(1),
(2), (4) Date: Dec. 19, 2003

(87) PCT Pub. No.: WO03/000598

PCT Pub. Date: Jan. 3, 2003

(65) Prior Publication Data

US 2004/0149665 A1    Aug. 5, 2004

(30) Foreign Application Priority Data

Jun. 22, 2001    (FR) .................................. 01 08258

(51) Int. Cl.
*C02F 1/66* (2006.01)

(52) U.S. Cl. ...................... 210/739; 210/752; 210/758; 210/760; 210/908; 210/910

(58) Field of Classification Search ................ 210/758, 210/760, 908
See application file for complete search history.

(56) References Cited

U.S. PATENT DOCUMENTS

| | | | |
|---|---|---|---|
| 3,725,226 A | 4/1973 | Stoner | |
| 3,915,853 A * | 10/1975 | Luck | ........................... 210/606 |
| 3,952,088 A | 4/1976 | Brown et al. | |
| 4,029,578 A | 6/1977 | Turk | |
| 4,693,833 A | 9/1987 | Toshikuni et al. | |
| 5,104,550 A * | 4/1992 | Stevens et al. | ............. 210/721 |
| 5,124,051 A * | 6/1992 | Bircher et al. | ............... 210/748 |
| 5,180,500 A * | 1/1993 | McConnell | .................. 210/721 |
| 5,320,718 A | 6/1994 | Molter et al. | |
| 5,322,644 A | 6/1994 | Dunn et al. | |
| 5,386,078 A | 1/1995 | Hanulik | |

(Continued)

FOREIGN PATENT DOCUMENTS

EP          0 526 305 A1    2/1993

(Continued)

*Primary Examiner*—Peter A. Hruskoci
(74) *Attorney, Agent, or Firm*—Pearne & Gordon LLP

(57) ABSTRACT

Method of treating an aqueous effluent containing organic matters in solution, comprising the following successive steps:
the effluent is rendered basic;
the effluent rendered basic is mineralized by being brought into contact with a gaseous oxidizing agent;
the mineralized basic effluent is rendered acidic; and
the effluent rendered acidic is again mineralized by being brought into contact with the gaseous oxidizing agent.

27 Claims, 1 Drawing Sheet

U.S. PATENT DOCUMENTS

Figure 1:
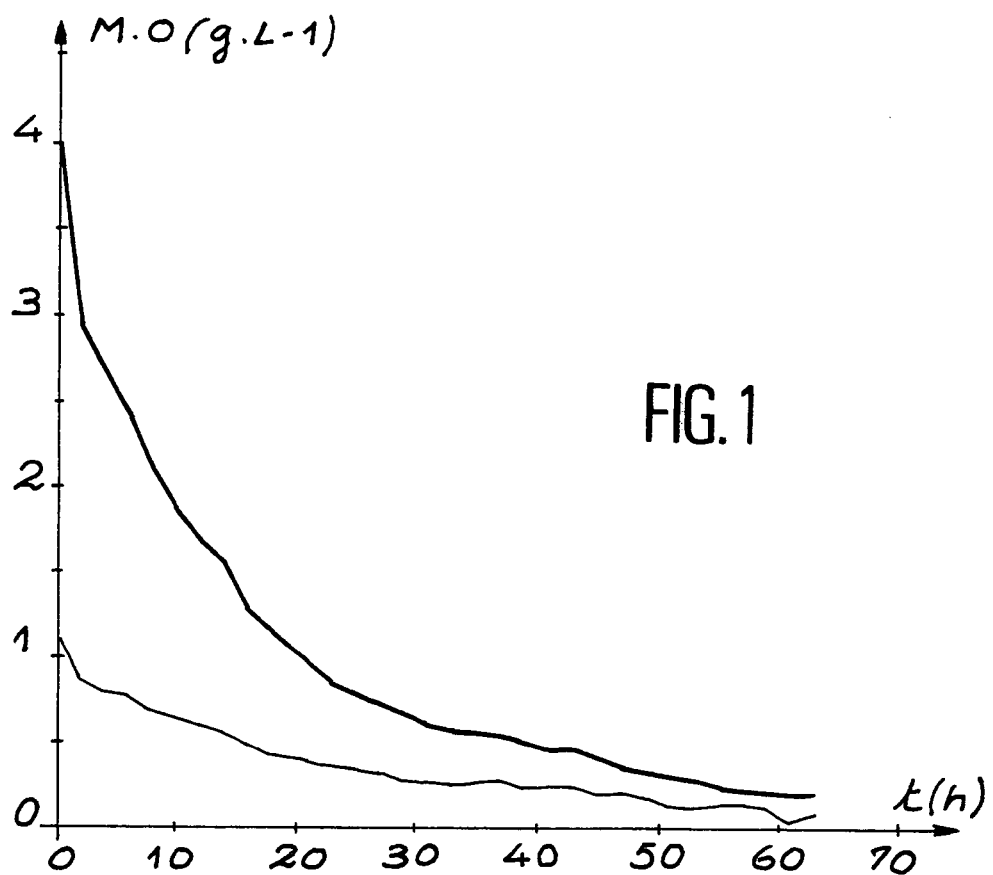

| | | |
|---|---|---|
| 5,536,389 A | 7/1996 | La Naour et al. |
| 5,564,105 A | 10/1996 | Alvino et al. |
| 5,894,077 A | 4/1999 | Jones et al. |
| 6,080,531 A | 6/2000 | Carter et al. |
| 6,258,281 B1 | 7/2001 | Niedbalski et al. |
| 6,800,196 B2 * | 10/2004 | Matsuo et al. ............... 210/149 |

FOREIGN PATENT DOCUMENTS

| | | |
|---|---|---|
| EP | 0 634 365 A1 | 1/1995 |
| EP | 0 674 323 A1 | 9/1995 |
| EP | 0 732 156 A1 | 9/1996 |
| FR | 2 534 900 A1 | 4/1984 |

* cited by examiner

METHOD FOR TREATING AN EFFLUENT, ESPECIALLY A RADIOACTIVE EFFLUENT, CONTAINING ORGANIC MATTER

TECHNICAL FIELD

The present invention relates to a method of treating an effluent, especially a radioactive effluent, containing organic matters in solution for the purpose of specifically removing said organic matter.

The method according to the invention applies in particular to the treatment of radioactive effluents coming from the steps involved in the decontamination of irradiated-fuel reprocessing plants.

The technical field of the invention may in general be defined as that of the treatment of effluents, particularly aqueous effluents, containing organic matters or compounds for the purpose of removing these organic matters.

Effluents containing organic matter are encountered in many industries, in particular in the nuclear industry.

This is because, for example, various steps in the decontamination of nuclear facilities involve aqueous solutions to which various organic reactants have been added.

Schematically, the organic molecules used in the steps of clean-up or decontaminating irradiated nuclear fuel processing plants may be classified into two families.

The first family comprises surface-active molecules or surfactants used in aqueous solution in order to remove TBP (tributyl phosphate) and its degradation products, which are mainly DBP (dibutyl phosphate) and MBP (monobutyl phosphate) from the plants and thus allowing the radioelements trapped in these "fatty" substances to be recovered.

Several methods are known that describe the use of various surfactant formulations comprising mixtures of surfactants.

The surfactants used have chemical formulae that are very varied, but they all possess a relatively long carbon chain forming their hydrophobic part.

Document EP-A-526 305 therefore describes a radioactive decontamination method using a surface-active foam.

Similarly, Document EP-A-0 674 323 relates to a radioactive decontamination method using a surface-active gel.

The second family of organic decontaminants comprises complexing or chelating agents used to dissolve certain radioelements. These complexing molecules are usually monocarboxylic or polycarboxylic acids and they therefore all possess a generally short carbon structure, namely one with fewer than 5 carbon atoms.

Document U.S. Pat. No. 5,386,078 therefore relates to the decontamination of a metal object by bringing it into contact with an aqueous formic acid solution, Document U.S. Pat. No. 5,322,644 relates to the decontamination of radioactive materials using a solution comprising ethylenediaminetetraacetic acid (EDTA), a carbonate and hydrogen peroxide and, finally, Document U.S. Pat. No. 5,564,105 relates to the treatment of aqueous decontamination solutions containing a complexing agent which is vanadium formate or a carboxylic acid, such as oxalic acid, citric acid, picolinic acid, nitriloacetic acid, EDTA, formic acid or hydroethylenediaminetetraacetic acid (HEDTA).

The use of these products both in the first and the second family gives good results in terms of decontamination factors, but does, however, pose many effluent problems among which mention may be made, for example, of:

foamability problems during the concentration steps before post-treatment, especially by vitrification or bituminizing;

the problems of the subsequent chemical precipitation steps being disruptive; and problems of chemical reactivity of the containment bitumens being modified.

For these reasons, partial or complete destruction of the organic matter contained in the decontamination effluents is necessary most of the time. The same applies to other effluents, possibly non-radioactive effluents, of other origins.

The destruction of organic matter contained in effluents has been repeated in many documents.

Thus, Document U.S. Pat. No. 5,894,077 describes a method of treating radioactive effluents containing fission products and organic complexing compounds and Document U.S. Pat. No. 5,536,389 discloses a method of treating radioactive effluents containing organic matter, namely especially complexing agents, and radioelements such as technetium and/or ruthenium, in which the organic matter is destroyed electrolytically at the anode by an oxidation reaction.

Document U.S. Pat. No. 4,693,833 relates to a method of treating waste radioactive water containing organic matter such as acids, decontamination agents and surfactants by oxidation using hydrogen peroxide in the presence of iron and copper ions as catalysts, at a temperature of 60 to 90° C.

The destruction of organic matter present in aqueous solutions is not only of interest in the nuclear field; thus, Document U.S. Pat. No. 3,725,226 relates to the electrochemical inactivation of pathogenic agents, nitrates, nitrites, nitric acid and organic compounds, while Document U.S. Pat. No. 5,320,718 discloses a method for removing the oxidizable organic matter from an aqueous solution in which an electrolysis cell is used with a solid-state polymer electrolyte. The organic compounds are introduced into the anode compartment and the anode is raised to various potentials that allow the organic compounds to be absorbed on the catalyst of the anode, and then destroyed by oxidization.

All the methods for removing organic compounds, substances or materials described above, although they are in certain cases relatively effective, they do pose a number of problems that make them tricky to apply, in particular in the case of the treatment of effluents in the nuclear industry, such as the effluents resulting from the clean-up or decontamination of an irradiated nuclear fuel processing plant.

Thus, the electrolytic methods require a plant especially dedicated for this operation to be established, comprising an electrolyser, systems of electrodes, etc., this plant, in the case of the treatment of radioactive effluents, is contaminated as soon as it is commissioned and constitutes one more element to be cleaned up;

methods involving cerium pose problems regarding the resistance of plants to cerium, which is a corrosive agent, including in the case of the steels that are used to make the mineralization tanks; to elevate this drawback, the use of cerium requires the construction of a resistant mineralization reactor made of a special and expensive material, exclusively dedicated to this operation;

in certain cases, the mineralization is incomplete and results in by-products that are still organic. These by-products are generally short-chain carboxylic acids of the $C_2$ or $C_3$ type, the innocuousness of which by-products with respect to post-treatment processes on the effluent has to be checked;

methods using hydrogen peroxide require a high working temperature, of at least 60° C., thereby requiring the treatment reactor to be heated, and the addition of various catalysts based on metals, that are expensive in terms of effluent; and finally, most of the methods described above are effective for treating organic matter present in acidic aqueous solution (pH<7). However, clean-up steps may especially be envisaged that involve basic aqueous solutions (pH>7) in which the abovementioned methods may then lose their effectiveness (for example, precipitation of insoluble cerium in a basic medium).

There is therefore a need for a method of treating an aqueous effluent containing organic matters in solution, in particular radioactive effluents, resulting, for example, from the decontamination of irradiated nuclear fuel processing plants, which, inter alia, does not require a complex plant to implement it, which allows the organic matters to be completely destroyed, which does not operate at a high temperature, which is rapid, simple and reliable and which can be used to treat all types of effluent, however, for example, their pH, the nature of the organic matters and their concentration.

It is one objective of the present invention to provide a method of treating an aqueous effluent containing organic matters, substances or compounds that meets, inter alia, the abovementioned requirement.

It is also an objective of the present invention to provide a method of treating aqueous effluents containing organic matters in solution that does not have the drawbacks, shortcomings, limitations and disadvantages of the methods of the prior art and that solves the problems of the methods of the prior art.

These objectives and also others are achieved, in accordance with the invention, by a method of treating an aqueous effluent containing organic matters in solution, comprising the following successive steps:

the effluent is rendered basic;
the effluent rendered basic is mineralized by being brought into contact with a gaseous oxidizing agent;
the mineralized basic effluent is rendered acidic; and
the effluent rendered acidic is again mineralized by being brought into contact with the gaseous oxidizing agent.

The method according to the invention essentially comprises two specific steps called "mineralization steps", by bringing the effluent into contact with a gaseous oxidizing agent, one step following the other, in sequence, in a specific manner. The first of the mineralization steps is, according to the invention, carried out in basic medium and the second of the mineralization steps is, according to the invention, carried out in acid medium.

The two steps are different and separate, each fulfilling a specific role.

According to the invention, the method comprises a specific sequence of mineralization steps, firstly comprising a step in basic medium and then a step in acid medium, one following the other in a specific manner.

The succession of specific steps according to the invention is neither described nor suggested by the prior art.

It may also be pointed out that the method according to the invention results, in the case of each step, from a choice from among an infinite number of possible treatments, followed by the choice of a specific sequence of the steps chosen.

The method according to the invention makes it possible to destroy almost all, or indeed all, the organic matters within the effluent, irrespective of the nature of these organic matters and that concentrations and also irrespective of the nature of the effluent, which may, for example, be radioactive and/or acid.

The organic matters are converted, completely or almost completely, after the two steps of the method of the invention, into gaseous carbon dioxide that can be easily discharged or removed; after the method of the invention no solid or liquid organic residue remains.

Consequently, in the case of the treatment of radioactive effluents coming, for example, from the decontamination of nuclear facilities, the final effluent treated by the method of the invention is perfectly compatible with the final treatment processes, such as vitrification or incorporation into a bituminous matrix.

The method according to the invention is simple, reliable and inexpensive, and can be used very easily in existing plants. The method according to the invention does not require specific, complex plants or specific materials in order to implement it.

Advantageously, the oxidizing gas is a mixture consisting of ozone and at least one other gas preferably chosen from oxygen and nitrogen.

It is known that, in the field of the treatment of waste water, the content of organic matters is often reduced by using ozone as oxidizing agent, as described in Documents U.S. Pat. No. 6,080,531 and U.S. Pat. No. 4,029,578. Ozone is the oxidizing agent of powerful redox pairs, both in acid medium and in basic medium:

at 25° C. and pH=0: $E°O_3/O_2$=2.075 V/SHE
at 25° C. and pH=14: $E°O_3/O_2$=1.246 V/SHE However, the use of ozone in acid medium poses a problem as it is possible for the ozone to form, with unsaturated organic molecules, triozonides via a nucleophilic addition reaction on alipathic double bonds, according to the following scheme:

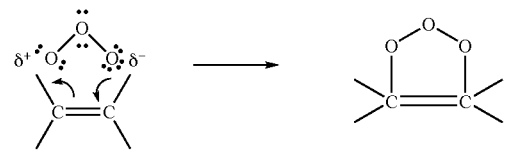

These triozonides are unstable molecules whose rapid decomposition can give rise to explosive reactions.

By virtue of the method of the invention in which a first operation is specifically carried out in basic medium, any possibility of forming unstable triozonides is thus eliminated. The method according to the invention thus overcomes a major drawback of the methods of the prior art that use ozone. This is because the formation of triozonides in basic medium is impossible since, in such a medium, the ozone reacts almost instantly with the hydroxyl ions in solution so as to form highly reactive radical species (hydroperoxides and superoxides) that cannot give rise to molecular reactions such as those described above. Ozone is therefore an oxidizing agent of choice for the mineralization operation in basic medium that is involved in the method of the invention.

Advantageously, the effluent rendered basic has a pH of greater than 9, preferably greater than 12. The process of transferring ozone into solution is of high efficiency at such a pH.

Advantageously, the effluent is rendered basic by addition of an alkali or alkaline-earth metal hydroxide, such as sodium hydroxide, potassium hydroxide, magnesium hydroxide, lithium hydroxide or calcium hydroxide, preferably by the addition of sodium hydroxide, which then ensures excellent mineralization of the organic matter into salts, for example sodium salts.

Advantageously, the hydroxide is added to the effluent at a concentration to ensure optimum mineralization. For example, in the case of sodium hydroxide, it is added at a concentration of greater than or equal to 1.4 g of sodium per gram of TOC (total organic carbon) in the effluent, which ensures optimum mineralization.

Advantageously, the mineralized basic effluent is rendered acidic by adding a solution of mineral acid, preferably nitric acid.

Advantageously, the final concentration of mineral acid, for example nitric acid, of the effluent rendered acidic is 0.1 to 5 mol/l.

Advantageously, the first mineralization step (in basic medium) is monitored by measuring the concentration of the species in solution in the effluent to be treated, for example by chromatography.

Preferably, the species in solution are formates, acetates, glycolates, carbonates and oxalates, preferably of an alkali metal such as sodium.

Advantageously, the second mineralization step is initiated when all of the organic matters are in the form of carboxylic acid salts.

Advantageously, said salts are carbonates and oxalates, preferably of an alkali metal such as sodium.

Advantageously, the mineralization steps are carried out at a temperature of 5 to 70° C., preferably 20 to 30° C. The method according to the invention is therefore carried out at low temperature and generally does not require external energy to be supplied.

In general, the organic matters are surface-active agents or surfactants, and/or complexing agents or chelating agents, etc.

The effluent to be treated is generally an acidic, especially radioactive, effluent such as that coming from the clean-up of a nuclear facility, for example an irradiated-fuel processing plant.

Figure 2:
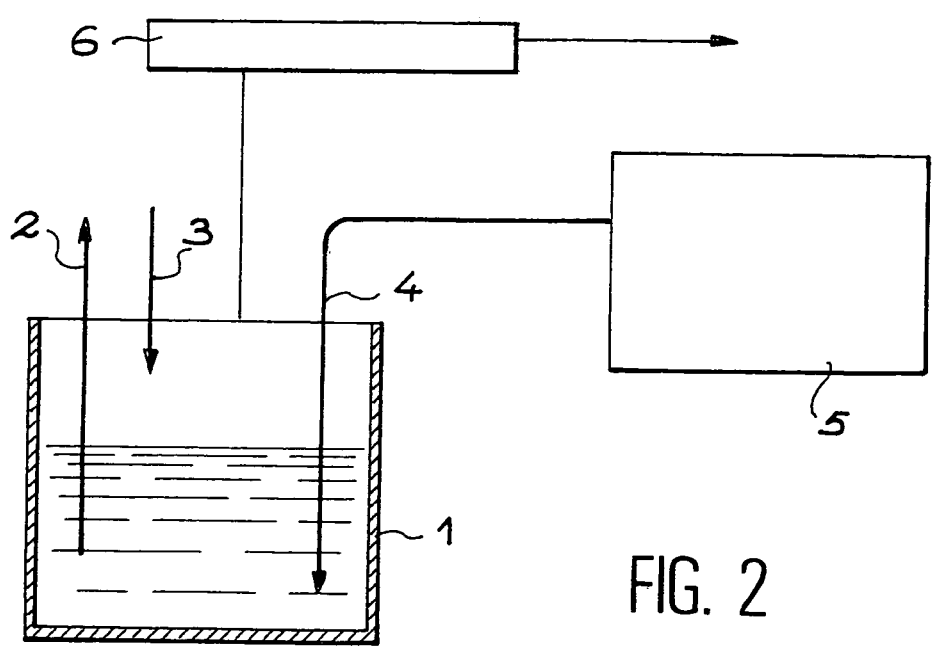

The invention will now be described in detail in the description that follows, given by way of illustration but implying no limitation, with reference to the appended drawings, in which:

FIG. 1 is a graph showing the variation in the content of organic matter (OM) in g/l as a function of the time in hours during the basic mineralization step of the method of the invention. The bold curve shows the variation of the COD and the non-bold curve the variation of the TOC; and FIG. 2 is a schematic sectional view of a plant for implementing the method of the invention.

The method of the invention is a method for treatment of aqueous effluents that contain organic matters in solution.

These organic materials, compounds, substances or molecules are generally surface-active agents or surfactants and/or complexing agents or chelating agents.

The effluents may furthermore contain other, inorganic or mineral, materials, compounds or substances, for example metals such as iron, chromium, nickel, etc., radionucleotides, such as plutonium, uranium, americium, etc.

Advantageously, the method of the invention applies to the treatment of acidic aqueous effluents, that is to say those having a pH of less than 7. These effluents contain, for example, a mineral acid such as nitric acid.

The method according to the invention is particularly suitable for treating radioactive effluents.

The radioactive effluents may come from any type of facility using radioelements. They thus emanate generally from the nuclear industry, for example nuclear power stations, laboratories, fuel preparation plants or irradiated-fuel processing plants.

The effluents treated are, in particular, the effluents resulting from the clean-up of a nuclear facility such as an irradiated-fuel processing plant.

As already indicated above, the method according to the invention advantageously allows the radioactive acidic aqueous effluents to be effectively treated and the organic matter thereof to be completely mineralized.

According to the invention, in a first step the effluent is rendered basic.

Preferably, the effluent rendered basic has a pH of greater than 9, preferably greater than 12.

The effluent is rendered basic, generally by adding an alkali or alkaline-earth metal hydroxide, for example sodium hydroxide, calcium hydroxide, lithium hydroxide, magnesium hydroxide or potassium hydroxide.

The base used to render the effluent basic must generally be used in excess with respect to the TOC (total organic carbon). Thus, if the effluent is rendered basic by adding sodium hydroxide, the concentration is generally greater than or equal to 1.4 grams of sodium per gram of TOC in the effluent.

The method then continues with the mineralization of the effluent rendered basic ("basic mineralization" step) by bringing the effluent into contact with a gaseous oxidizing agent.

In general, the effluent is brought into contact with the gaseous oxidizing agent by injecting the gaseous oxidizing agent directly into the effluent to be treated and mineralized. In other words, the gaseous oxidizing agent is sparged or bubbled into the effluent to be treated.

The oxidizing agent generally consists of a gas mixture formed from ozone and at least one other gas preferably chosen from oxygen and nitrogen.

The proportions of the gas mixture are generally such that the volume content of ozone is from 0.5 to 20% and the volume content of the other gas or gases is 80 to 99.5%.

The basic mineralization is generally carried out at a temperature of 5 to 70° C., and preferably 20 to 30° C., this being a relatively low temperature compared with a number of methods of the prior art.

The reactions that take place are generally characterized by the conversion of the organic matters or substances into salts, preferably alkali metal salts, for example sodium salts if the solution was rendered basic by sodium hydroxide, of carboxylic acid.

The species produced during the mineralization reaction are, for example, analysed by ion liquid chromatography with UV detection, and the chemical nature of the principal intermediate species is identified by in-line coupling between the mass spectrometry and the chromatography.

Complementary analyses are carried out, for example by $^{13}C$ and $^{31}P$ NMR (nuclear magnetic resonance).

Throughout the reaction, the following are formed:
sodium carbonate $Na_2CO_3$ (which constitutes the final stage of the mineralization);
sodium oxalate $Na_2(CO_2)_2$; and
sodium phosphate $Na_3PO_4$ (the phosphorus comes from the phosphorus-containing species possibly present in the effluent—these species are mainly TBP and its degradation products).

Furthermore, three salts of carboxylic acids constitute the predominant intermediate species formed by oxidation of the carbon chains of the organic molecules; these are:

sodium formate $NaHCO_2$;
sodium glycolate $NaCO_2CH_3OH$; and
sodium acetate $NaCO_2CH_3$.

During the first half of the reaction, the progressively oxidative fractionation of the alkyl chains of the organic matters gives mainly sodium carbonate ($CO_3^{2-}$, $2Na^+$) and sodium formate ($HCOO-Na^+$). The carbon chain fragments coming from these oxidative processes can be revealed by their low-field NMR signal and their influence on the chromatography signal at 210 nm, with an increase in the apparent molar extinction coefficient.

Above a degree of mineralization of 50%, three new salts of carboxylic acids appear, namely sodium acetate ($CH_3COO^-Na^+$), sodium glycolate ($CH_2OHCOO^-Na^+$) and sodium oxalate ($C_2O_4^{2-}2Na^+$). The alkyl chain fragments present become progressively fewer with corresponding disappearance of the NMR signal.

Above a degree of mineralization close to 70%, there is progressive disappearance of the three intermediate carboxylic acid salts and an increase in the amounts of sodium carbonate and sodium oxalate.

The end of the reaction is characterized by the complete disappearance of sodium acetate, sodium glycolate and sodium formate, in favour of sodium carbonate, sodium oxalate and sodium phosphate.

The chemical species formed do not depend on the initial organic molecule as, in basic medium, the radical species formed react in a non-specific manner. Whatever the carbon-containing molecule, this oxidizes into a mixture of sodium oxalate and sodium carbonate.

The method according to the invention is therefore absolutely not limited by the nature of the organic matters in the effluent and can be applied very generally.

The $^{13}C$ NMR spectra of a standard effluent, that is to say an aqueous decontamination surfactant solution from an irradiated-fuel processing plant, before and after the basic mineralization step, show that the carbon chains initially present in the effluent disappear in favour of carbonate and oxalate moities.

The $^{13}P$ NMR spectrum of the basic mineralized effluent shows that the phosphorus-containing species initially present in the effluent are integrally converted into phosphates.

The ozone-induced mineralization reaction also results in a uniform reduction in the concentration of organic matters. This change may be assessed by monitoring two macroscopic quantities representative of a concentration of organic molecules, namely TOC (total organic carbon) and COD (chemical oxygen demand).

FIG. 1 shows the variation in the content of organic matter (OM), expressed in g/l, as a function of time (t) in hours; the curve in bold represents the COD and the non-bold curve shows the TOC during the basic mineralization of a standard effluent.

Whatever the initial concentration of organic matters, which for example may be from 10 to 1 gram per liter, the ozone consumption profile is reproducible.

Approximately ⅓ of the ozone is consumed in achieving a degree of mineralization of 70%.

Approximately ⅔ of the ozone is consumed in achieving a degree of mineralization of 90%.

The amount of ozone consumed during the mineralization step in basic medium will generally be about 8 to 9 grams of ozone per initial gram of organic matters.

The ozonizer installed will therefore be sized according to this proportion and to the desired duration of the treatment of a batch.

It was seen above that the ozone-induced reaction of mineralizing the organic molecules forms salts, for example sodium salts, in solution; the amount of sodium used is therefore, in general, preferably about 1.4 grams per gram of initial organic matters. The initial concentration of base, such as sodium hydroxide, must in general be sufficient to allow the formation of the various salts and to maintain a pH of greater than 9, and more preferably greater than 12, which ensures that the transfer of ozone into solution has a good yield.

Table I summarizes the characteristics of a standard effluent before and after the basic mineralization step.

TABLE I

| Characteristics of a standard effluent before and after basic mineralization | | |
|---|---|---|
| Characteristics | Before mineralization | After mineralization |
| TOC (g/l) | 1.2 | 0.1 |
| COD (g/l) | 4.00 | 0.06 |
| NaOH (mol/l) | 0.75 | 0.65 |
| Composition | Organic matters: 2 g/l | Na carbonate: 3.5 g/l |
| | | Na oxalate: 0.8 g/l |
| | | Na phosphate: 0.22 g/l |

This shows that the first mineralization step, or basic mineralization, is characterized in that it allows almost all the organic matters initially present to be converted into a mixture of sodium carbonate and sodium oxalate.

Thanks to the first mineralization step and to the monitoring of the characteristic species, for example sodium oxalate, sodium carbonate or intermediate carboxylic acids, for example by chromatography, the absence of double bonds may be guaranteed. As a result, the formation of ozonides and the risks that they entail are completely eliminated.

After the basic mineralization step according to the invention, the mineralized basic effluent is rendered acidic.

The second mineralization step, or acid mineralization, is generally started when all of the organic matter is in the form of simple carboxylic acid salts and more particularly in the form of alkali or alkaline-earth metal, for example Na, carbonate salts and alkali or alkaline-earth metal, for example Na, oxalate salt.

The acidification is preferably carried out by the addition to the mineralized basic effluent of a solution of mineral acid, for example nitric acid. The acid solution is added to the effluent so that the pH of the effluent is less than 7, preferably less than 1, and so that the final concentration of mineral acid, after addition of acidifying acid, is from 0.1 to 5 mol/l.

Once the effluent has been rendered acidic, the second mineralization step is then carried out by bringing the effluent rendered acidic into contact with the gaseous oxidizing agent. Thus, according to the invention, the method involves the sequence of two separate, successive, mineralization steps.

The second mineralization step or acid mineralization is carried out approximately under the same conditions, particularly temperature conditions, as the first mineralization step or basic mineralization.

In practice, the injection and the bubbling of the gas into the effluent are stopped after the basic mineralization and is resumed in order to carry out the acid mineralization.

The continuation of the mineralization in acid medium, according to the second mineralization step, allows the residual oxalate, preferably sodium oxalate, to be converted into carbonate, preferably sodium carbonate, which is unstable in active medium and therefore gives off gaseous carbon dioxide by undergoing the reaction:

$$Na_2CO_3 + 2H^+NO_3^- = CO_2 + 2NaNO_3 + H_2O.$$

The sodium oxalate, with an initial concentration of about 500 mg/l, progressively disappears over the course of time and its concentration reaches, for example, about 300 mg/l after two hours and about 0 after six hours.

Table II summarizes the characteristics of a standard degreasing effluent, namely an aqueous decontamination surfactant solution from an irradiated-fuel reprocessing plant, premineralized in basic medium, before and after the acid mineralization step.

TABLE II

Characteristics of a standard effluent before and after the acid mineralization step

| Characteristics | Before mineralization | After mineralization |
| --- | --- | --- |
| TOC (g/l) | 0.1 | 0 |
| COD (g/l) | 0.06 | 0 |
| Composition | Na carbonate: 3.5 g/l | Na carbonate: 0 g/l |
|  | Na oxalate: 0.8 g/l | Na oxalate: 0 g/l |
|  | Na phosphate: 0.22 g/l | Na phosphate: 0.22 g/l |

From this it may be concluded that the sequence of mineralization steps of the method according to the invention makes it possible to remove all of the organic matters contained in an aqueous effluent for the clean-up of irradiated-fuel reprocessing plants.

An apparatus for implementing the method according to the invention is described in FIG. 2.

The method of the present invention may be implemented very simply in whatever industrial facility (5), such as an irradiated-fuel processing plant. All that is required to do this is a reaction tank (1) containing the effluent to be mineralized. The reaction tank comprises at least:

a system for taking off a specimen (2), which allows the reaction to be monitored and the mineralization steps to be carried out in sequence;

a device (3) for injecting liquid reactants, in order to carry out the basic and acid mineralization phases in sequence;

a gas injection device (4) for feeding the ozone-containing gas mixture into the effluent; and a gas treatment circuit in which a device for destroying the residue ozone is placed, which device may contain, for example, a thermal ozone destruction system (6).

The ozone will be produced from an ozone generator (5) designed to produce the stream of ozone needed for treating the volume of effluent contained in the tank (1).

The apparatus for implementing the present invention requires only a minor modification of existing plants, which amounts to placing an ozone production circuit on any circuit for injecting gas into a tank, which will be dedicated for the operation. The mineralization tank may be any tank of the process and will be chosen according to the volumes of effluent to be treated and does not have to be made of a material different from that generally used in irradiated-fuel processing plants.

The invention claimed is:

1. Method of treating an aqueous effluent containing organic matters in solution, comprising the following successive steps:
   the effluent is rendered basic;
   the effluent rendered basic is mineralized by being brought into contact with a gaseous oxidizing agent;
   the mineralized basic effluent is rendered acidic; and
   the effluent rendered acidic is again mineralized by being brought into contact with the gaseous oxidizing agent.

2. Method according to claim 1, in which the oxidizing gas is a mixture consisting of ozone and at least one other gas.

3. Method according to claim 2, in which said at least one other gas is selected from the group consisting of oxygen and nitrogen.

4. Method according to claim 1, in which the effluent rendered basic has a pH of greater than 9.

5. Method according to claim 1, in which the effluent is rendered basic by addition of an alkali or alkaline-earth metal hydroxide.

6. Method according to claim 5, in which the alkali or alkaline-earth metal hydroxide is sodium hydroxide, which is added at a concentration of greater than or equal to 1.4 g of sodium per gram of TOC in the effluent.

7. Method according to claim 1, in which the mineralized basic effluent is rendered acidic by adding a solution of mineral acid.

8. Method according to claim 1, in which the final concentration of mineral acid of the effluent rendered acidic is 0.1 to 5 mol/l.

9. Method according to claim 1, in which the first mineralization step is monitored by measuring the concentration of the species in solution in the effluent to be treated.

10. Method according to claim 9, in which the first mineralization step is monitored by measuring the concentration of at least one of formate, acetate, glycolate, carbonate and oxalate.

11. Method according to claim 9, in which the first mineralization step is monitored by chromatography.

12. Method according to claim 9, in which the first mineralization step is monitored by measuring the concentration of at least one of formate, acetate, glycolate, carbonate and oxylate of an alkali metal.

13. Method according to claim 12, in which the first mineralization step is monitored by measuring the concentration of at least one of Na formate, acetate, glycolate, carbonate and oxalate.

14. Method according to claim 1, in which the second mineralization step is initiated when all of the organic matters are in the form of carboxylic acid salts.

15. Method according to claim 14, in which said salts are carbonates and oxalates.

16. Method according to claim 14, in which said salts are sodium carbonates and oxalates.

17. Method according to claim 1, in which the mineralization steps are carried out at a temperature of 5 to 70° C.

18. Method according to claim 1, in which the organic matters are surface-active agents or surfactants, and/or complexing agents or chelating agents.

19. Method according to claim 1, in which the effluent to be treated is an acidic effluent.

20. Method according to claim 1, in which the effluent to be treated is a radioactive effluent.

21. Method according to claim 20, in which the effluent comes from the clean-up of a nuclear facility.

22. Method according to claim 1, in which the effluent rendered basic has a pH of greater than 12.

23. Method according to claim 1, in which the effluent is rendered basic by addition of an alkali or alkaline-earth metal hydroxide selected from the group consisting of sodium hydroxide, lithium hydroxide, calcium hydroxide, magnesium hydroxide or potassium hydroxide.

24. Method according to claim 1, in which the mineralized basic effluent is rendered acidic by adding a solution of nitric acid.

25. Method according to claim 1, in which the mineralization steps are carried out at a temperature of 20 to 30° C.

26. Method according to claim 14, in which said salts are carbonates and oxalates of an alkali metal.

27. Method according to claim 20, in which the effluent comes from the clean-up of an irradiated-fuel reprocessing plant.

* * * * *